United States Patent Office 2,902,459
Patented Sept. 1, 1959

2,902,459

AQUEOUS DISPERSION CONTAINING OXIDIZING ACID, PHENOL-ALDEHYDE RESIN, AND POLYMER OF VINYL ACETATE

Jan Teppema, East Gloucester, Mass., assignor, by mesne assignments, to The Borden Company, New York, N.Y., a corporation of New Jersey No Drawing. Application October 20, 1954
Serial No. 463,587

4 Claims. (Cl. 260—29.3)

The present invention relates to adhesives useful in the bonding of wood, fabric, metal, glass and other porous and nonporous surfaces. In particular, it relates to adhesives suitable for forming permanent weather-resistant bonds between glass, ceramic, plastics, porcelain, enamel, steel, aluminum, copper, asbestos, and other mineral boards, to similar surfaces or to wood.

In the co-pending patent application of Jan Teppema entitled "Wood-Bonding Resins" are disclosed quick setting, fast curing, heat resistant and water-resistant bonding materials for wood and cellulosics provided by mixtures of addition polymer aqueous emulsions with water-dispersible or water-dispersed phenolic resins. An example of such material is a mixture of polyvinyl acetate emulsion with normally inter-reactive and water dispersible A-stage phenol-formaldehyde condensation products. These compositions are described in said application as particularly useful with wood and other cellulosic materials and speeded in their bond-setting by the use of acids. I have found, however, that when such compositions are used with inorganic or nonporous surfaces such as metal, glass, ceramic, plastic and asbestos, that they are generally unsatisfactory.

In accordance with the present invention, I have found that aqueous dispersions containing normally inter-reactive phenol aldehyde condensation products and addition polymers provide unexpectedly strong bonding materials for metal, glass, plastic, asbestos, ceramic and similar inorganic or nonporous surfaces when to the dispersions are added a quantity of oxidizing acid such as nitric, chromic or perchloric acid or an oxidizing agent in the presence of a non-oxidizing acid. Non-oxidizing acids such as sulfuric, hydrochloric, trichloracetic, hypophosphorous or toluene-sulfuric when used without an oxidizing agent yield compositions having poor bonding qualities for such surfaces.

I have further found that the adhesive compositions of this invention provide such an unexpectedly high and permanent bond strength that they can be used to construct structural insulated metal panels to be used in place of masonry walls, for use in preparing aluminum-wood panels resistant to boiling water, for laminates of aluminum and stainless steel, for laminates of copper foil to dielectric plastics such as are used in electrical printed circuits, and for many similar uses. In all these cases, I have found no blushing or peeling after immersion in boiling water or indefinite soaking in water at room temperature.

The polymeric emulsions useable in this invention are those aqueous emulsions of addition polymers formed in substantial proportion from polymerizable monomers having at least one single carbon-carbon double bond, and includes both homopolymers and copolymers. Such monomers include but are not limited to vinyl esters such as vinyl acetate, vinyl propionate and vinyl butyrate; vinyl chloride; vinylidene chloride; styrene; alphamethyl-styrene; vinyl toluene; vinyl naphthalene; methyl, ethyl, propyl and butyl acrylates and methacrylates; chloroprene; butadiene and isoprene. Examples of useful copolymeric emulsions are vinyl acetate-dibutyl maleate, styrene-acrylonitrile, acrylate and methacrylate esters with acrylonitrile, isoprene-styrene, isoprene-acrylonitrile, butadiene-styrene and butadiene with methacrylate and acrylate esters.

Phenol aldehyde resins useable with this invention include any phenol-aldehyde condensation product that is further inter-reactive and either soluble in water, soluble in a solvent to form a water dispersible solution, directly dispersible in water or soluble in another solvent dispersible with the polymeric emulsion or formed into an aqueous dispersion compatible with the polymeric emulsion. Among such condensation products are those that are base catalyzed to yield liquid, A-stage products. The preferred phenolic components useable in the condensation products include phenol, substituted phenols, polyhydric phenols and mixtures thereof. The preferred aldehydic components include formaldehyde, furfuraldehyde, acetaldehyde, paraldehyde, polymers and mixtures thereof. The essential requirement other than solubility or water-dispersibility is that the condensation product be normally inter-reactive in the sense that it is an intermediate product, further self-reactive in the presence of either heat or catalysts or both. It is also essential, of course, that it be formed into a dispersion having a substantially aqueous phase in order to be compatible with the polymeric vinyl emulsions.

Methods of making polyvinyl emulsions such as are useable in this invention are well known and are conveniently summarized in the book, "Vinyl and Related Polymers," by C. E. Schildknecht (Wiley, New York, 1952), in which there is a large bibliography, both of patents and publications.

Polyvinyl ester emulsions, for example, can be produced by reacting the vinyl ester monomer in aqueous dispersion at temperatures 70 to 85° C. in the presence of an emulsifying agent and catalyst. Emulsifying agents commonly used in preparing such polymeric vinyl emulsions include polyvinyl alcohol, fatty alcohol sulfates, polyethylene oxide condensation products with fatty acids, alkyl-aryl sulfonates and protective colloids, such as proteins and polymeric carbohydrates. Catalysts include peroxides and persulfates such as benzoyl peroxide and potassium persulfate. A wide variety of polyvinyl emulsions are available commercially, and usually have particle size ranging from 0.05 to 0.20 microns, total solids of 45 to 60 percent, pH 4 to 6, and a viscosity range of 500 to 2000 centipoises.

As Example 1, a polyvinyl ester emulsion suitable for use in this invention is prepared as follows:

| | Parts by weight |
|---|---|
| Water | 50 |
| Vinyl acetate | 50 |
| Polyvinyl alcohol (emulsifier) | 5 |
| Sodium acetate | 3 |
| Potassium persulfate (catalyst) | 1 |

The above ingredients are reacted in a vessel equipped with a reflux condenser and an agitator at a temperature of about 75° C. for about two hours.

As Example 2, a suitable polyvinyl acetate emulsion can be prepared as follows:

| | Parts by weight |
|---|---|
| Water | 49 |
| Dioctyl sodium sulfosuccinate (emulsifier) | 3 |
| 30% hydrogen peroxide (catalyst) | 0.2 |
| Vinyl acetate | 51 |

The above ingredients are reacted in a vessel equipped with an agitator and a reflux condenser at a temperature of 65° C. for two to four hours.

As Example 3, a suitable polyvinylacetate emulsion can be prepared as follows:

| | Parts by weight |
|---|---|
| 0.1-N solution of equal parts of sodium acetate and sodium hydroxide | 35 |
| Benzoyl peroxide | 0.1 |
| 0.3% aqueous solution of dioxyl sodium sulfosuccinate | 55.0 |
| Vinyl acetate | 60.0 |

The above ingredients are reacted at 65° C. to 70° C. for two to four hours in a vessel having an agitator and reflux condenser.

Example 4 is a vinyl acetate copolymer emulsion:

Parts by weight:
- 50 of water
- 45 of freshly distilled vinyl acetate
- 5 dibutyl maleate
- 5 polyvinyl alcohol (emulsifier)
- 3 parts sodium acetate
- 0.5 potassium persulfate (catalyst)

The ingredients are reacted at 65° to 70° C. for 1 to 2 hours or until the reaction is completed, usually 4 to 8 hours.

Polystyrene emulsions suitable for use in this invention are prepared by reacting styrene dispersed in water with a catalyst such as potassium persulfate, in the presence of a buffer such as sodium dihydrogen phosphate and an emulsifier such as lauryl sodium sulfate, depending upon the concentration and type of catalysts. The reactions take between 1 and 3 hours in a temperature range from 50 to 90° C.

As Example 5, a suitable polystyrene emulsion is prepared as follows:

| | Parts by weight |
|---|---|
| Styrene | 100 |
| Water | 100 |
| Sodium salts of soluble rosin acids (emulsifier) | 5 |
| Sodium hydroxide | 0.061 |
| Potassium persulfate (catalyst) | 0.60 |

The above mixtures, of pH about 11, is reacted for about ten to fourteen hours at 50° C.

Preparation of copolymers of styrene, such as, butadiene-styrene copolymers have been well described. As Example 6, the following formulation can be used in the practice of this invention by reacting with agitation at 30° C.:

| | Parts by weight |
|---|---|
| Butadiene | 70 |
| Styrene | 30 |
| Water | 20 |
| Nonyl phenol condensate with ethylene oxide | 5 |
| Cumene-hydroperoxide (catalyst) | 0.5 |
| Iron sulfate | 0.05 |
| Sodium phosphate | 0.5 |
| Sorbose | 0.5 |

This particular formulation known as redox type recipe yields a substantially complete product after five hours.

Various examples of phenol-aldehyde resins useable with this invention are given below. As will be noted, especially satisfactory results are obtainable with base-catalyzed condensations carried out to the so-called resol or A-stage to yield a resin which may be liquid itself, but which in any case is dilutable or dispersible with water to a high solids content to form a dispersion compatible with the vinyl emulsion.

*Example 7*

A phenolic resin is prepared by slow reflux of 1 mol of phenol, 1.9 mols of formaldehyde and .2 mols of sodium hydroxide with a minimum amount of water for about 30 minutes or until the proper viscosity is obtained. The resultant resin is an A-stage or resol liquid resin, which will become infusible upon heating, and after adjusting has the following typical properties:

| | |
|---|---|
| pH | 7.2 |
| Solids content percent | 65 |
| Specific gravity | 1.202 |
| Viscosity centipoises | 22 |
| Water dilutability percent | 300 |

In practicing this invention, the resin may be used as formed, or as extended with a suitable solvent such as methyl ethyl ketone.

The following is a mixed phenol condensate:

*Example 8*

A resin dispersion suitable for mixing with polymeric emulsion is prepared as follows:

75 parts phenol
25 parts cardanol
80 parts formaldehyde are refluxed in the presence of 5 parts of 2-N hydrochloric acid with a minimum amount of water until a solid fusible reaction product is formed. The product is then recovered and dissolved as a 70 percent solution in methyl ethyl ketone. This resin solution can be used at half strength directly or formed into a dispersion as follows:

50 parts resin solution is added to a mixture comprising 46 parts of water, 3⅓ parts of casein, and 0.35 part of 50 percent sodium hydroxide solution. The resultant dispersion is then ready for mixture with the polymeric vinyl emulsion.

Although any solids content of components can be used, it is preferred that the polymeric emulsion have a solids content of 40–65 percent and the phenolic resin 50–75 percent. Practically any ratio of admixture components can be used but especially useful is 2–4 parts of polymer emulsion per part of phenolic resin in terms of solids. Using polyvinyl acetate emulsion (about 55 percent solids) and phenolic resin (about 75 percent solids) the resultant admixture viscosities are in the range 500–1500 centipoises, with a stable end product.

Among the oxidizing acids which can be used in this invention are nitric acid, chromic acid, perchloric acid and permanganic acid. The oxidizing acid may be provided as an acid salt or as a mixture of the oxidizing salt and another acid. Thus, mixtures of sulphuric acid and potassium permanganate or sulphuric acid and potassium chromate may be used. As example of such acid-salt mixture is equal parts of 1-N potassium permanganate and 2-N sulfuric acid. However, this invention is not intended to be limited to oxidizing acids but to extend to oxidizing agent-acid combinations, as for example, acetyl peroxide-hydrochloric acid.

The preferred amount of oxidizing acid or equivalent agent-acid mixture to be used with the admixture is in the range of 1 to 10 parts by weight of acid per 100 of the admixture where the acid normality is 0.5 to 5.

As a specific example of this invention is the following:

*Example 9*

150 parts of polyvinyl acetate emulsion having a solids content of about 55 percent (Example 2) was mixed with 50 parts of a liquid, 75 percent solids resin formed by a single stage reaction of 1.3 mols of formaldehyde, 1 mol of phenol and .2 mol of sodium hydroxide. To this mixture was then added 2 parts of a mixture of 1 part of 12-normal nitric acid and 3½ parts of water. After appropriate mixing, the finished liquid product was applied in the amount of 25 lbs./1000 square feet to the following pairs of surfaces and in each case cured for 5 minutes at a temperature of 135° C.:

A. Aluminum to wood
B. Aluminum to stainless steel
C. Aluminum to cellulose sponge
D. Coated steel to asbestos board
E. Aluminum to glass
F. Aluminum to aluminum
G. Glass fiber to steel
H. Copper foil to heat hardened phenol formaldehyde plastic
I. Ceramic coated steel to asbestos board
J. Porcelain to glass
K. Aluminum to gypsum board
L. Plastic laminate (phenolic resin) to wood
M. Plastic laminate (phenolic resin) to aluminum In each of these cases the bonded product was then immediately immersed in boiling water for a period of twenty minutes and soaked for a week in water. In spite of this treatment, no blushing, peeling or delamination was noted.

The highly resistant bonding power was totally unexpected, since polyvinyl acetate emulsions by themselves have practically no water resistance and the normal time and temperature for curing phenolic resins is considerably higher than used above. The promotion of cure at such relatively low temperatures is an important consideration when bonding two dissimilar surfaces having different rates of thermal expansion.

As a further example of the remarkable bonding qualities of the products of this invention the above formulation was used to bond a single basswood veneer between two aluminum sheets. The adhesive was applied to one side of both the aluminum sheets and the assembly pressed for ten minutes in a hot press at 125° C. at 100 pounds pressure per square inch. The initial shear was found to be 212 pounds per square inch with a wood failure of 66 percent. At 180° F. the shear was 176 pounds per square inch with 69 percent wood failure. After soaking for 7 days in water, the shear was 175 lbs. per square inch with 78 percent wood failure. After 7 days' soaking in gasoline the shear was 168 pounds per square inch with 63 percent wood failure.

In all the above samples the clamping time ran from about 20 to 60 minutes.

Other specific embodiments of this invention are given below.

*Example 10*

Admixture:
    100 parts polyvinyl acetate emulsion (Example 1)
    10 parts phenolic resin (Example 7) dissolved as 75% solids in 20% aqueous methyl ethyl ketone solution
Acid: 10 parts 2-N perchloric acid

*Example 11*

Admixture:
    100 parts butadiene-styrene emulsion (Example 6) or polystyrene emulsion (Example 5)
    50 parts mixed—phenolic resin (Example 8) dispersion or solution
Acid: 7 parts 3-N chromic acid

*Example 12*

Admixture:
    100 parts polyvinyl acetate emulsion (Example 2)
    40 parts liquid phenol-furfuraldehyde resin as 75% solids water dispersion resin being made by reacting 1 mol phenol, 1.8 mols furfuraldehyde, 0.2 mol sodium hydroxide for 40 minutes at 100° C.
Acid: 10 parts 3-N nitric acid

*Example 13*

Admixture:
    100 parts polyvinyl acetate (Example 1 or Example 3) emulsion
    50 parts phenolic resin (Example 7)
Acid:
    7 parts 1-N potassium permanganate
    7 parts 2-N sulfuric acid

*Example 14*

Admixture:
    100 parts copolymer-polyvinylacetate (Example 4)
    50 parts phenolic resin (Example 8)
Acid: 10 parts 3-N nitric acid Each of the compositions of the above Examples 10, 11, 12, 13 and 14 when tested for surface pairs A–M (as above) by spreading 25 lbs. per 1000 square feet and curing for 5 minutes at 135° C. gave results substantially equivalent to those obtained with the Example 9 composition.

In addition to single components, in an admixture combinations of components can also be used and are considered within the scope of this invention. Thus, the polymer emulsion component might include a mixture of polystyrene and polyvinyl acetate emulsions, and the resinous dispersion might contain phenol-formaldehyde resin and cardanol-furfural resin.

Further, polymeric vinyl emulsions which contain modifiers, plasticizers, extenders, or small amounts of solvent co-monomer in addition to the principal monomer, have been found equally effective as compared to substantially pure emulsions of similar solids content and stability. Examples of such modified vinyl emulsions are the commercial emulsions, Polycos 117SS, 117H, 376, 380, 397–70 NS, 456 and 1040–14B, all products of the American Polymer Co., Peabody, Massachusetts.

The term polymer of vinyl acetate as used in the appended claims is intended to include both homopolymers and copolymers of vinyl acetate with small amounts of comonomer, as, for example, 10% of dibutyl maleate.

In the appended claims the range of acid proportions are expressed in terms of milliequivalents per hundred parts of dry total resin. The acid range expressed is found in the specific examples, namely Examples 9 and 10.

In the examples the total milliequivalents of acid is calculated by multiplying the weight of the acid by the normality of the acid. To calculate the milliequivalents of acid per hundred parts by weight of dry resin one divides the total milliequivalents of acid by the sum of the polymer dry weight and the phenolic dry weight and then multiplies the result by 100.

Thus, in Example 9 we multiply 1 times 12 to give 12 milliequivalents of acid. The sum of polymer and phenolic in terms of dry weight is (150) (.55) plus (50) (.75) or a total of 120. We thus have 12 milliequivalents of acid per 120 dry weight resin—or 10 per 100.

Likewise, in Example 10 we have 10 times 2 or 20 milliequivalents of acid. The sum in dry solid terms of polymer and phenol is (100) (0.50) plus (10) or a total of 60. The ratio of 20 to 60 is equivalent to 33.3 per 100.

I claim:

1. An admixture of an aqueous resinous dispersion with an oxidizing acidic composition selected from the group consisting of aqueous solutions of nitric acid, chromic acid, perchloric acid, permanganic acid, and acetyl peroxide-hydrochloric acid; said dispersion comprising dispersed therein an A-stage, water dispersible resinous product of the condensation of a phenol and an aldehyde, and a polymer of vinyl acetate; the weight ratio of polymer of vinyl acetate to resinous product being in the range of approximately 1.0 to 5.0; the amount of acid in milliequivalents per 100 parts of the total of polymer of vinyl acetate and resinous product being in the range of approximately 10 to 33.3.

2. The admixture of claim 1 wherein the resinous product is the reaction product of formaldehyde and phenol.

3. The admixture of claim 1 wherein the acidic composition is an aqueous solution of nitric acid.

4. An admixture of an aqueous resinous dispersion with an oxidizing acidic composition selected from the group consisting of aqueous solutions of nitric acid, chromic acid, perchloric acid, permanganic acid, and acetyl peroxide-hydrochloric acid; said dispersion comprising dispersed therein an A-stage, water-dispersible resinous product of the condensation of a phenol and an aldehyde, and a polymer of vinyl acetate; the weight ratio of polymer of vinyl acetate to resinous product being in the range of approximately 1.0 to 5.0; said acidic composition having an acid normality of from 0.5 to 5 and being present in the range of 1 to 10 parts per 100 by weight of the admixture.

References Cited in the file of this patent
UNITED STATES PATENTS

| | | |
|---|---|---|
| 2,481,879 | Ross | Sept. 13, 1949 |
| 2,564,291 | Wolf | Aug. 14, 1951 |
| 2,612,481 | Cone | Sept. 30, 1952 |
| 2,652,353 | Wilson | Sept. 15, 1953 |